(12) United States Patent
Sun et al.

(10) Patent No.: US 7,575,543 B1
(45) Date of Patent: Aug. 18, 2009

(54) BIT-STORING APPARATUS

(76) Inventors: Ying Sun, No. 19, Alley 28, Lane 851, Jhongshan Rd., Shengang Township, Taichung County (TW) 429; Chi Sun, No. 19, Alley 28, Lane 851, Jhongshan Rd., Shengang Township, Taichung County (TW) 429

( * ) Notice: Subject to any disclaimer, the term of this patent is extended or adjusted under 35 U.S.C. 154(b) by 0 days.

(21) Appl. No.: 12/284,374

(22) Filed: Sep. 22, 2008

(51) Int. Cl.
*B23Q 3/157* (2006.01)
(52) U.S. Cl. .......................... 483/62; 483/68; 211/1.56
(58) Field of Classification Search .................. 483/68, 483/66, 62, 65, 60, 59, 58; 211/1.56
See application file for complete search history.

(56) References Cited

U.S. PATENT DOCUMENTS

| | | | | |
|---|---|---|---|---|
| 4,296,541 A | * | 10/1981 | Tsuboi et al. | 483/68 |
| 5,704,885 A | * | 1/1998 | Lee | 483/62 |
| 6,042,524 A | * | 3/2000 | Kato | 483/62 |
| 6,514,184 B2 | * | 2/2003 | Oitaka et al. | 483/68 |
| 7,104,941 B2 | * | 9/2006 | Sakuragi et al. | 483/68 |
| 2008/0039306 A1 | * | 2/2008 | Yang | 483/68 |

FOREIGN PATENT DOCUMENTS

| | | | | |
|---|---|---|---|---|
| JP | 61-136750 A | * | 6/1986 |
| JP | 2004-160595 A | * | 6/2004 |
| JP | 2005-081448 A | * | 3/2005 |

\* cited by examiner

*Primary Examiner*—Erica E Cadugan
(74) *Attorney, Agent, or Firm*—Charles E. Baxley

(57) ABSTRACT

A chain-type bit-storing apparatus is provided for a CNC machine tool. The chain-type bit-storing apparatus includes a chain engaged with sprockets rotationally provided thereon. The chain includes links each includes a frame, a rotator rotationally connected to the frame, a pin for pivotally connecting the frame thereof to the rotator of another link and a socket connected to the frame and used to receive a bit. There is a pivoting unit for pivoting a selected one of the bits by pivoting a related one of the links.

14 Claims, 6 Drawing Sheets

BIT-STORING APPARATUS

FIELD OF INVENTION

The present invention relates to a computer numeral control ("CNC") machine tool and, more particularly, to a bit-storing apparatus for a CNC machine tool to achieve fast replacement of a bit with another bit.

BACKGROUND OF INVENTION

CNC machine tools are common tools for operating bits to cut work pieces. Each CNC machine tool is equipped with a bit-storing apparatus and a bit-changing apparatus. Bits of various types and sizes are stored in the bit-storing apparatus. The bit-storing apparatus includes a transferring mechanism for transferring sockets each for receiving a bit. Initially, the bit-changing apparatus is used to get a selected one of the bits (the "first bit") from the bit-storing apparatus and engage the first bit with an axle of the CNC machine tool. If necessary, the bit-changing apparatus is used to replace the first bit with another bit (the "second bit"). To this end, the first bit is disengaged from the axle. Then, the second bit is taken from the bit-storing apparatus and engaged with the axle. Finally, the first bit is stored in the bit-storing apparatus again.

In a chain-type bit-storing apparatus, the transferring mechanism is a chain-sprocket unit including a chain engaged with sprockets. The chain includes links each including a socket. The rotation of the sprockets causes the movement of the chain and, therefore, the movement of the bits. There are various chain-type bit-storing apparatuses. The structures of the chain-type bit-storing apparatuses are complicated and the operation of the chain-type bit-storing apparatuses is inefficient.

The present invention is therefore intended to obviate or at least alleviate the problems encountered in prior art.

SUMMARY OF INVENTION

It is the primary objective of the present invention to provide a CNC machine tool with an efficient bit-storing apparatus.

To achieve the foregoing objective, the chain-type bit-storing apparatus includes a chain engaged with sprockets rotationally provided thereon. The chain includes links each includes a frame, a rotator rotationally connected to the frame, a pin for pivotally connecting the frame thereof to the rotator of another link and a socket connected to the frame and used to receive a bit. There is a pivoting unit for pivoting a selected one of the bits by pivoting a related one of the links.

Other objectives, advantages and features of the present invention will be apparent from the following description referring to the attached drawings.

BRIEF DESCRIPTION OF DRAWINGS

The present invention will be described via the detailed illustration of the preferred embodiment referring to the drawings.

DETAILED DESCRIPTION OF PREFERRED EMBODIMENT

Figure 1:
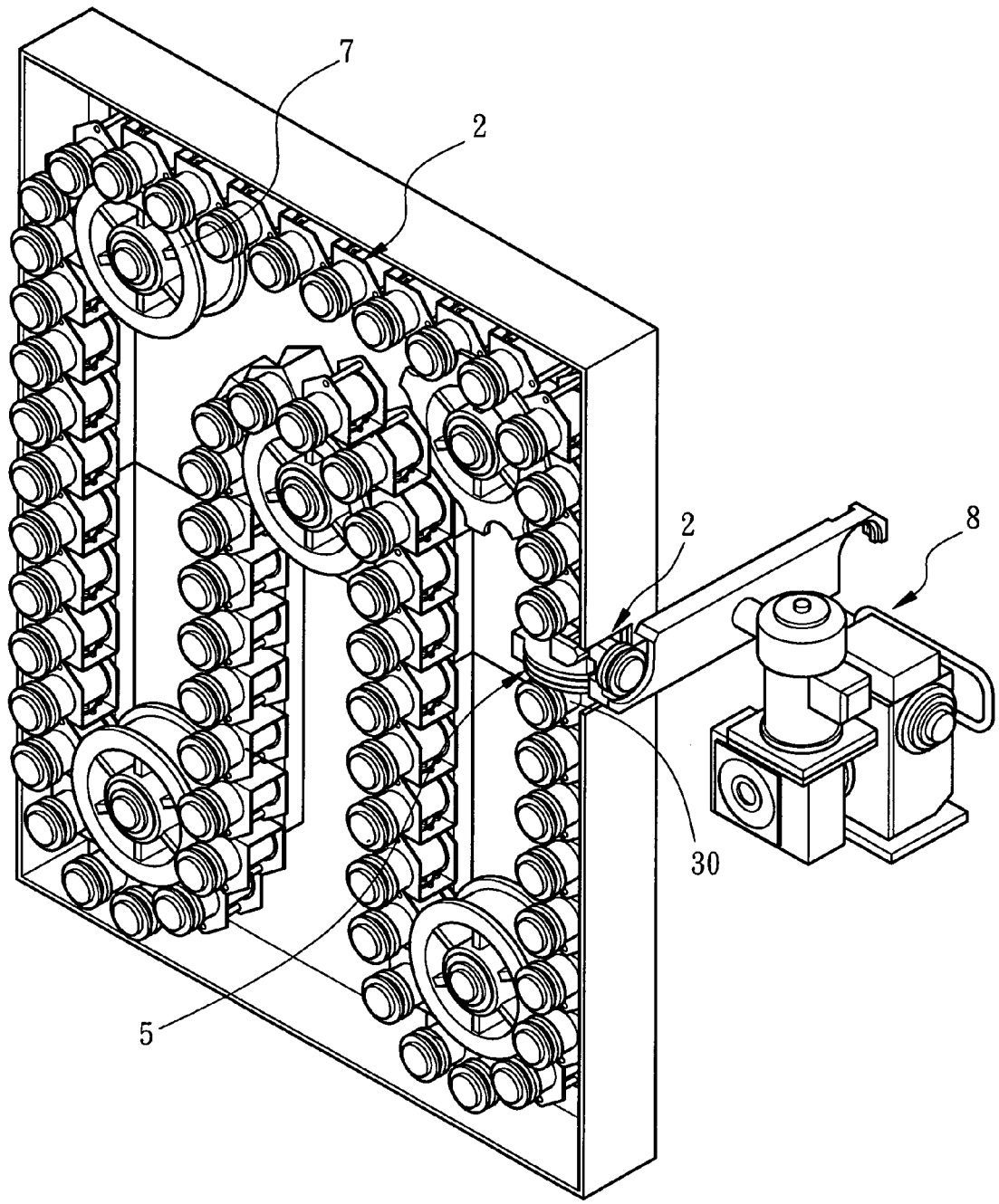
FIG. 1 is a perspective view of a bit-changing apparatus and a bit-storing apparatus according to the preferred embodiment of the present invention.
Figure 2:
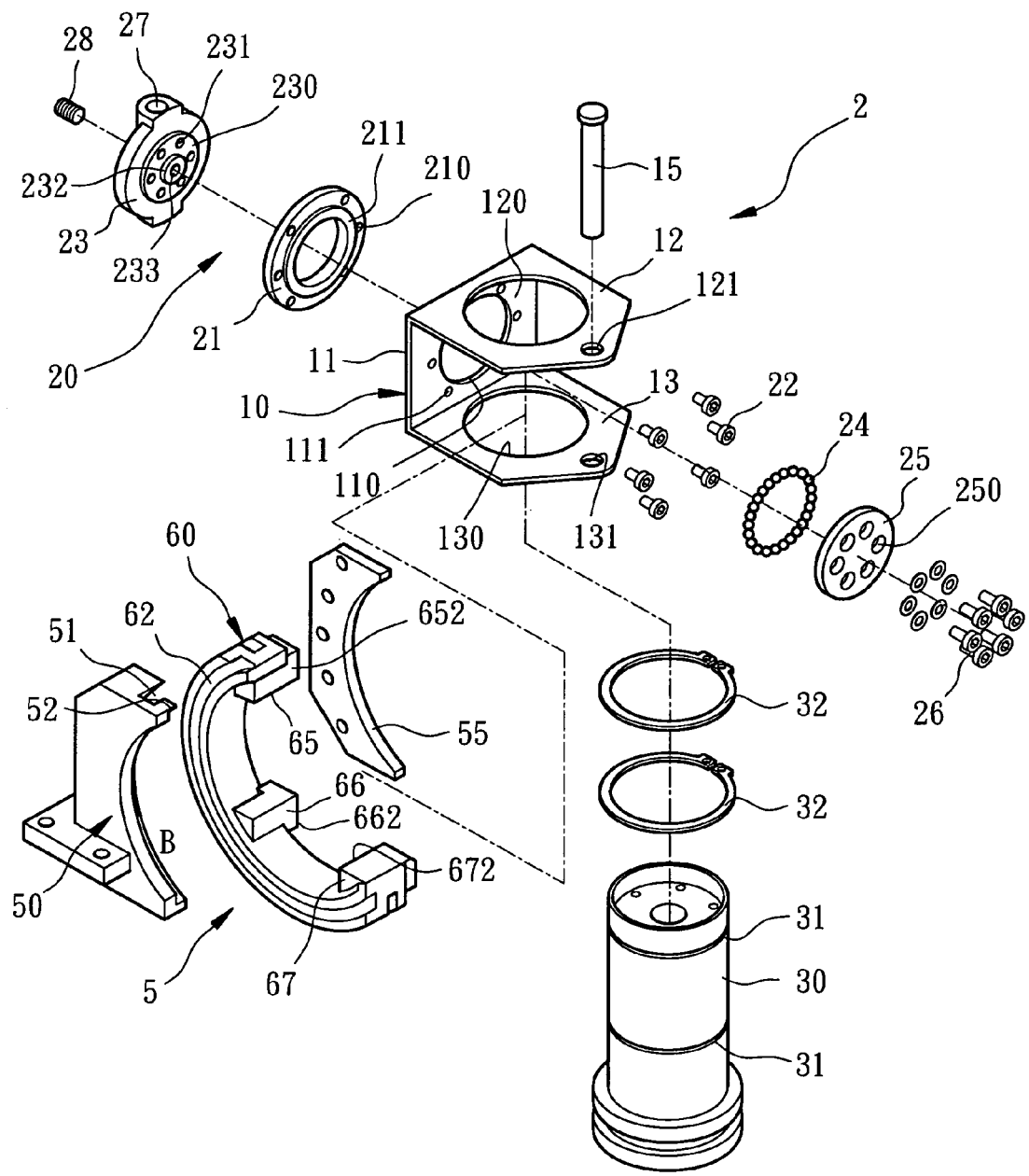
FIG. 2 is an exploded view of a handle of a bit and a socket, a link of a chain-sprocket unit and a pivoting unit of the bit-storing apparatus shown in FIG. 1.

Referring to FIGS. 1 and 2, there are shown a bit-changing apparatus 8 and a bit-storing apparatus according to the preferred embodiment of the present invention. The bit-storing apparatus includes a case, a chain-sprocket unit and a pivoting unit 5. The chain-sprocket unit includes a chain 1 engaged with sprockets 7, in the case. The chain 1 includes links 2 each for holding a shank of a bit. The pivoting unit 5 is used to pivot a selected one of the bits by pivoting a related one of the links 2. The bit-changing apparatus 8 and the bit-storing apparatus are provided on a CNC machine tool (not shown) so that each of the bits can be switched between a normal position and a pivoted position. In the normal position (FIG. 5), a bit is perpendicular to an axle of the CNC machine tool. In the pivoted position (FIG. 6), a bit is parallel to the axle of the CNC machine tool.

Initially, the pivoting unit 5 is used to pivot a bit (the "first bit") from the normal position to the pivoted position (FIG. 6) by pivoting the related link 2. Thus, the first bit is parallel to the axle of the CNC machine tool. The bit-changing apparatus 8 is used to get the first bit from the related link 2, pivot the first bit and engage the first bit with the axle of the CNC machine tool. Then, the related link 2 is returned to the normal position.

The bit-changing apparatus 8 and the bit-storing apparatus can be used together to replace the first bit with another bit (the "second bit"). To this end, the chain-sprocket unit is operated to move the second bit to the pivoting unit 5. The pivoting unit 5 is used to pivot the link 2 related to the second bit to the pivoted position from the normal position. Then, the bit-changing apparatus 8 is operated in three phases. In the first phase, it disengages the first bit from the axle of the CNC machine tool and takes the second bit from the related link 2. In the second phase, it rotates to switch the first and second bits. In the third phase, it engages the second bit with the axle of the CNC machine tool and returns the first bit to the related link 2.

Each of the links 2 includes a frame 10, a rotator 20 and a socket 30. The frame 10 includes a vertical plate 11 formed between an upper plate 12 and a lower plate 13. The vertical plate 11 includes an opening 110 defined therein and apertures 111 defined therein around the opening 110. An opening 120 and an aperture 121 are defined in the upper plate 12. An opening 130 and an aperture 131 are defined in the lower plate 13.

The rotator 20 includes a ring 21, threaded bolts 22, balls 24, a disc 25, a connector 23, threaded bolts 26 and an adjusting element 28. The ring 21 includes an annular groove 211 on a side and screw holes 210 defined therein around the annular grove 211. The threaded bolts 22 are driven in the screw holes 210 through the apertures 111 so that the ring 21 is secured to the vertical plate 11. The opening of the ring 21 is aligned with the opening 110 of the vertical plate 11.

The disc 25 includes apertures 250 defined therein and an annular groove 251 defined in a side. The connector 23 includes screw holes 231 defined therein, a boss 232 formed on a side, a screw hole 233 defined in the boss 232 and a tunnel 27 defined in an opposite side. The balls 24 are sandwiched between the ring 21 and the disc 25 so that each of the balls 24 includes a portion disposed in the annular groove 211 and another portion disposed in the annular groove 251. The threaded bolts 26 are driven in the screw holes 231 through the apertures 250 so that the disc 25 is connected to the connector 23. Both of the disc 25 and the connector 23 are rotational relative to the frame 10 and the ring 21 because of the balls 24. The adjusting element 28 is in the form of a threaded bolt driven in the screw hole 233. An end of the adjusting element 28 is extended from the screw hole 233 and abutted against the disc 25 to adjusting the distance between the ring 23 and the disc 25. The frame 10 of a link 2 (the "first link 2") can be connected to the frame 10 of another link 2 (the "second link 2") by inserting a pin 15 in the tunnel 27 of the first link 2 through the apertures 121 of the second link 2.

The pivoting unit 5 includes a guiding element 50 and a pivoting element 60. The guiding element 50 includes an arched groove 51 defined in a side and an arched track 52 formed on the side, parallel to the arched groove 51.

Figure 6:
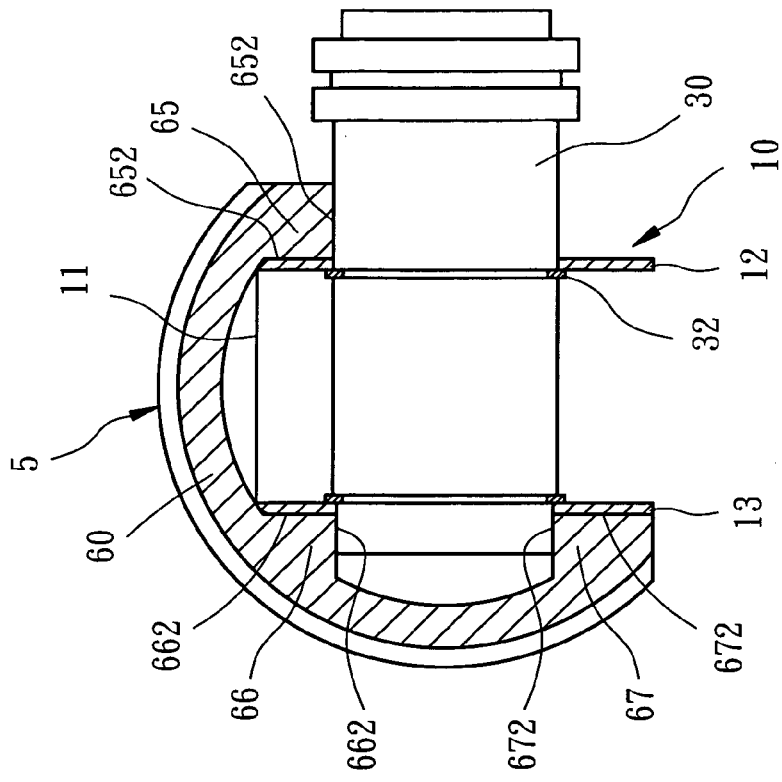
FIG. 6 is a cross-sectional view of the pivoting unit in another position than shown in FIG. 5.
Figure 5:
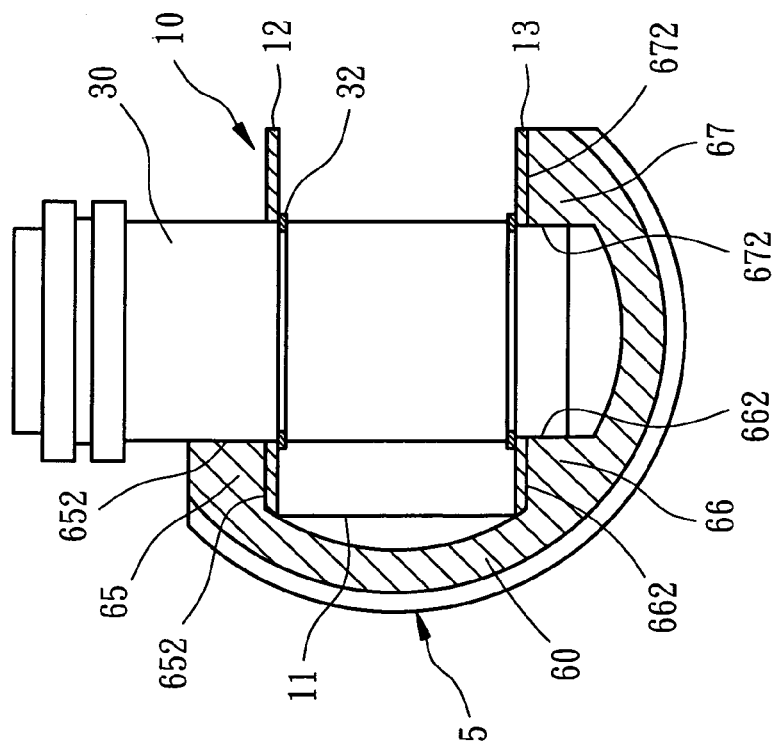
FIG. 5 is a cross-sectional view of the pivoting unit shown in FIG. 4.

Referring to FIGS. 5 and 6, the pivoting element 60 is a C-shaped element. The pivoting element 60 includes an arched groove 62 defined in a side, a first block 65 formed near an end, a second block 66 formed thereon and a third block 67 formed near another end. The first block 65 includes a contact face 650 and a contact face 652 perpendicular to the contact face 650. The second block 66 includes a contact face 660 towards the contact face 650 and a contact face 662 in a same plane with the contact face 652. The third block 67 includes a contact face 670 in a same plane with the contact face 660 and a contact face 672 in a same plane with the contact face 662.

The guiding element 50 is secured to the case of the bit-storing apparatus. The arched track 62 is movably disposed in the arched groove 52 so that the pivoting element 60 is rotational on the guiding element 50. A cover 55 is secured to the guiding element 50 to keep the pivoting element 60 on the guiding element 50.

The socket 30 includes two annular grooves 31 defined in the periphery. The socket 30 is inserted through the openings 120 and 130. A C-clip 32 is disposed in each of the annular grooves 31 to keep the socket 30 on the frame 10.

Figure 3:
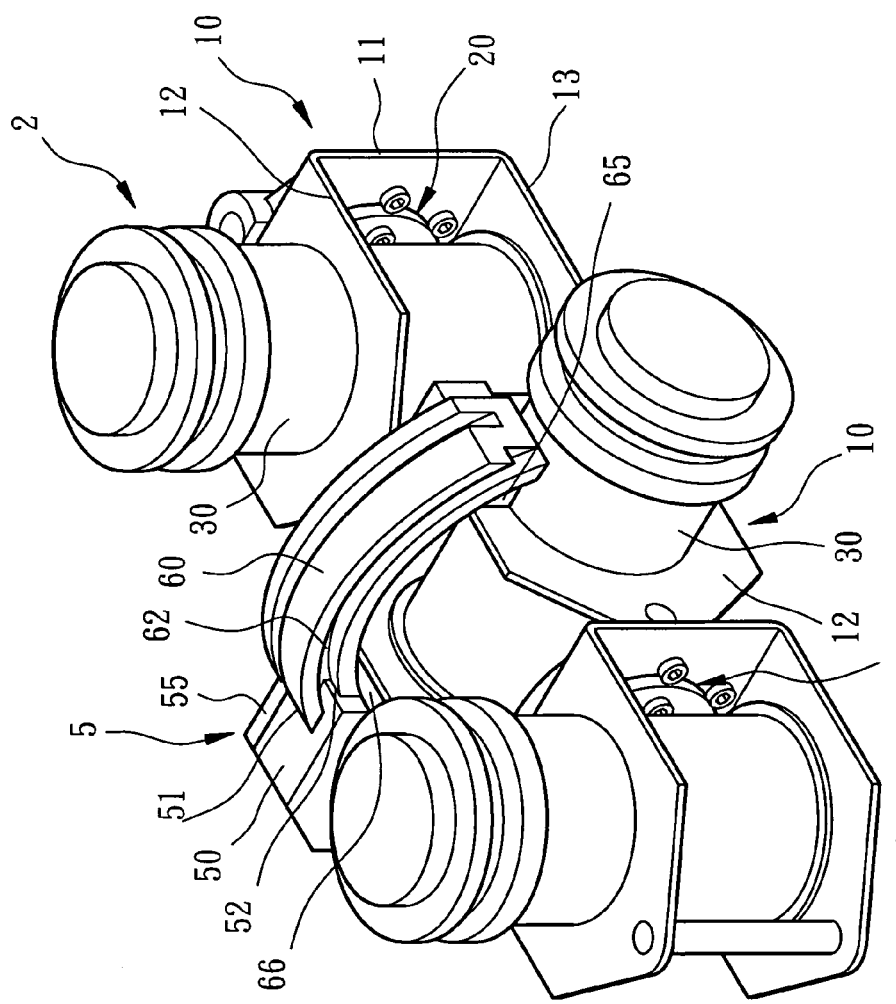
FIG. 3 is a perspective view of the handles of three bits and three sockets, three links of the chain-sprocket unit and the pivoting unit of the bit-storing apparatus shown in FIG. 1.
Figure 4:
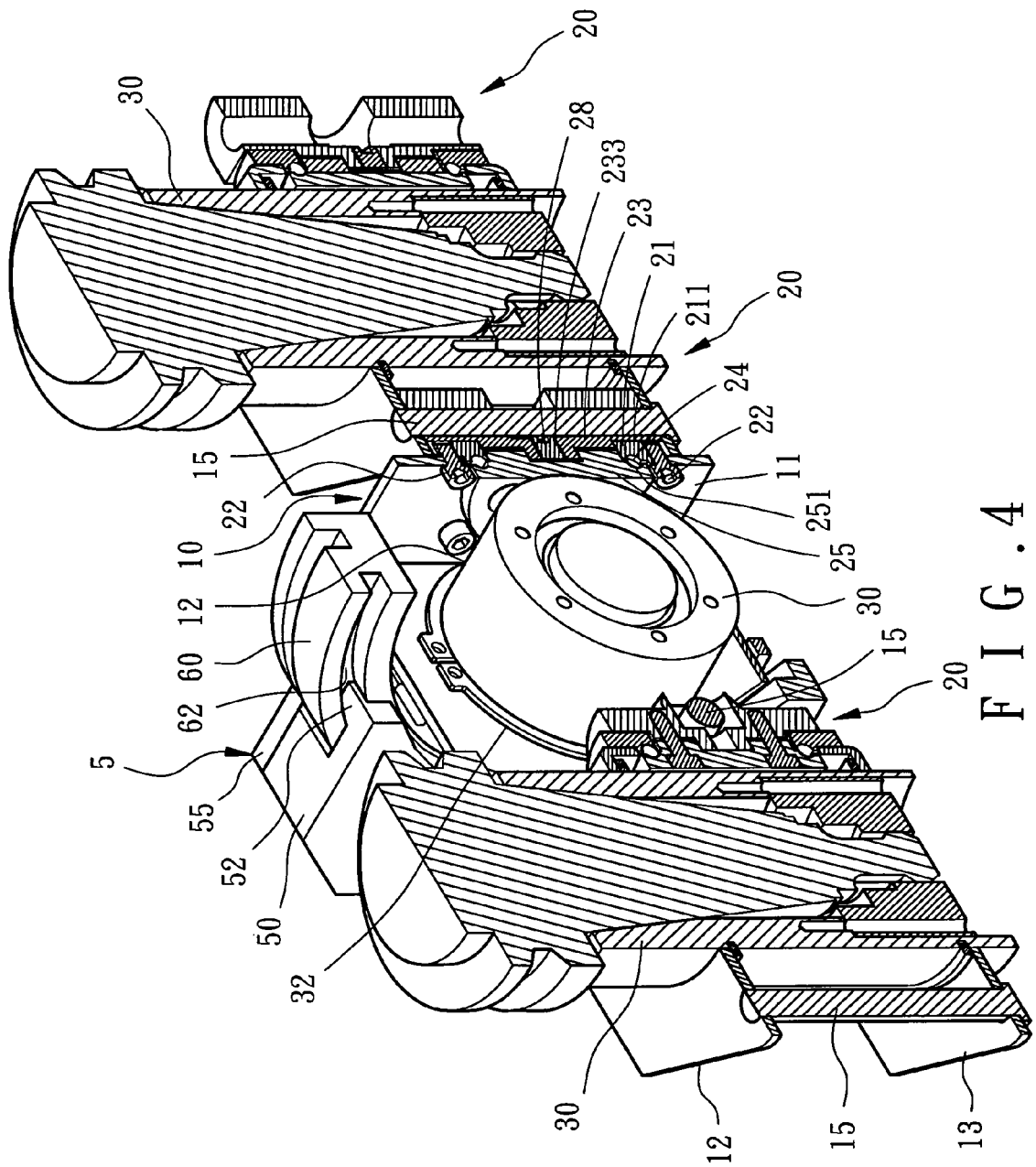
FIG. 4 is a cutaway view of the handles, the sockets, the links and the pivoting unit shown in FIG. 3.

Referring to FIGS. 3 and 4, there are shown three links 2 and the pivoting unit 5. One of the links 2 (the "selected link 2") is disposed in the pivoting unit 5.

Referring to FIG. 5, the socket 30 is in contact with the contact faces 650, 660 and 670. Now, the upper plate 12 is in contact with the contact face 652 while the lower plate 13 is in contact with the contact faces 662 and the contact 672. Thus, the selected link 2 is firmly held with the pivoting element 60. The selected link 2 is in the normal position. The pivoting element 6 is rotational on the guiding element 5 so that the selected link 2 can be moved to the pivoted position shown in FIG. 6.

Figure 7:
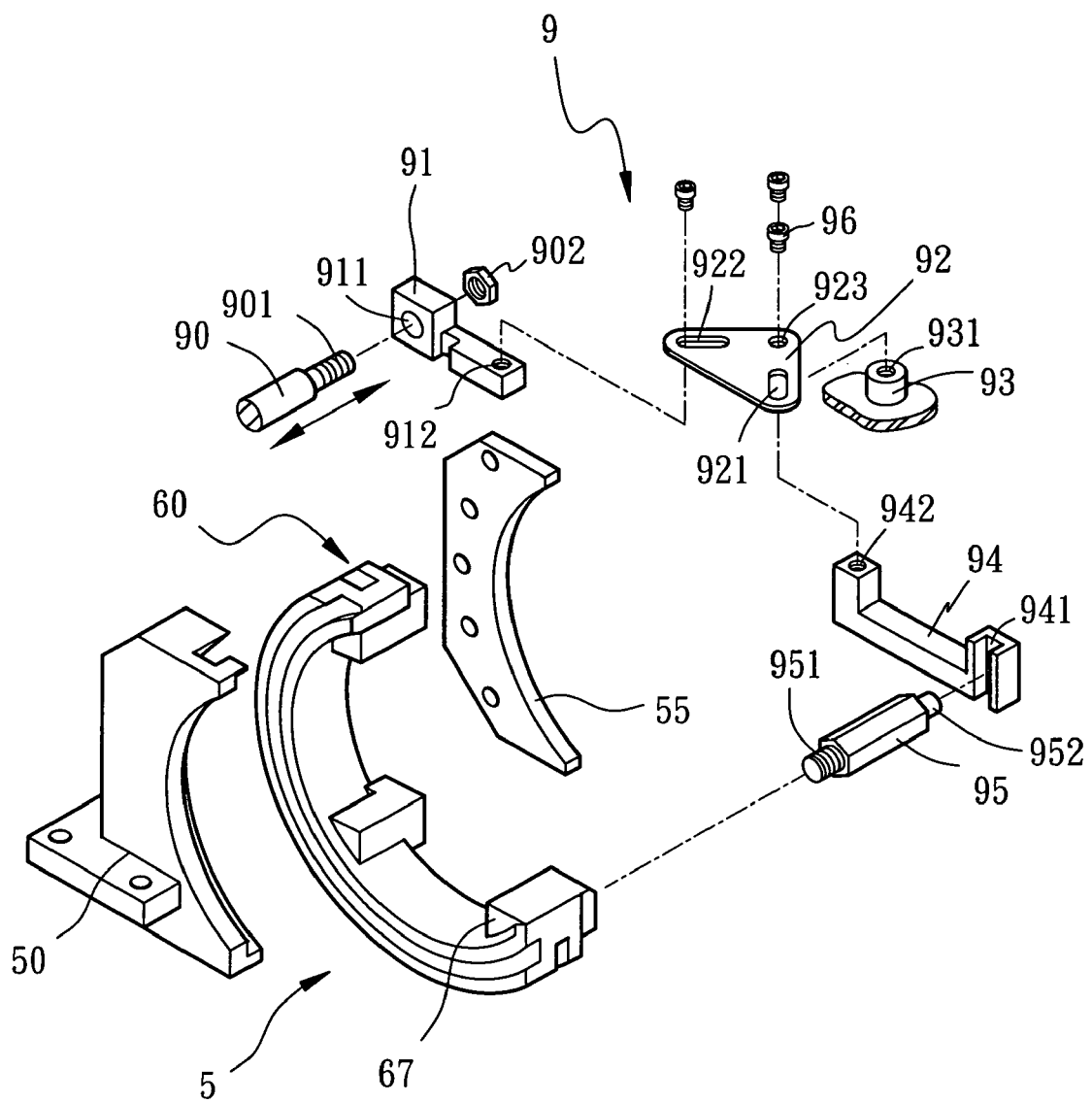
FIG. 7 is an exploded view of a unit for actuating the pivoting unit shown in FIG. 2.

Referring to FIG. 7, there is shown an actuating unit 9 for actuating the pivoting element 60. The actuating unit 9 includes a rod 90, a joint 91, a lever 92, a stem 93, a join 94 and a rod 95. The rod 90 is formed with a threaded tip 901. The joint 91 includes an aperture 911 defined near an end and a screw hole 912 defined near another end. The lever 92 is a substantially triangular plate. The lever 92 includes a slot 922 defined therein along an edge, a slot 912 defined therein along another edge and an aperture 923 defined therein near a corner between the edges. The stem 93 includes a screw hole 931 defined therein. The joint 94 includes a screw hole 942 defined near an end and a groove 941 defined near another end. The rod 95 is formed with a plain tip 952 and a threaded tip 951.

The stem 93 is formed on the case of the bit-storing apparatus. A threaded bolt 96 is driven in the screw hole 931 through the aperture 923 to pivotally connect the lever 92 to the stem 93. Another threaded bolt 96 is driven in the screw hole 912 through the slot 922 to pivotally and movably connect the joint 91 to the lever 92. The threaded tip 901 is inserted through the aperture 911 and engaged with a nut 902 to connect the rod 90 to the joint 91. Another threaded bolt 96 is driven in the screw hole 942 through the slot 921 to pivotally and movably connect the joint 94 to the lever 92. The joint 94 is limited to rectilinear movement on the case of the bit-storing apparatus. The plain tip 952 is movably disposed in the groove 941 to movably connect the rod 95 to the joint 94. The threaded tip 951 is driven in a screw hole defined in the pivoting element 60 to connect the rod 95 to the pivoting element 60.

The rod 90 is limited to movement along a rectilinear path. The joint is limited to movement along another rectilinear path perpendicular to the rectilinear path of the movement of the rod 90. The movement of the rod 90 causes the movement of the joint 91. The movement of the joint 91 causes the pivotal of the lever 92 on the stem 93. The pivotal of the lever 92 causes the movement of the joint 94. The movement of the joint 94 causes the two-dimensional movement of the rod 95. The movement of the rod 95 causes the pivotal of the pivoting element 60.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A chain-type bit-storing apparatus comprising:
   sprockets rotationally provided thereon;
   a chain engaged with the sprockets for being driven in a chain path, wherein the chain comprises links each comprising:
   a frame;
   a rotator rotationally connected to the frame;
   a pin extending through the frame and through the rotator of another link for pivotally connecting the frame thereof to the rotator of another link, wherein a longitudinal axis of the pin is transverse with respect to the chain path; and
   a socket connected to the frame and used to receive a bit; and
   a pivoting unit for pivoting a selected one of the bits by pivoting a related one of the links.

2. The chain-type bit-storing apparatus according to claim 1, wherein each frame comprises an upper plate, a lower plate and a vertical plate formed between the upper and lower plates, and the socket is inserted through the upper and lower plates.

3. The chain-type bit-storing apparatus according to claim 2, wherein each of the links comprises two C-clips engaged with the socket and abutted against the upper and lower plates to retain the socket on the frame.

4. The chain-type bit-storing apparatus according to claim 1, wherein each rotator comprises:
   a ring secured to the respective frame;
   a disc rotationally connected to the ring; and a connector connected to the disc and used to receive the pin of another link.

5. The chain-type bit-storing apparatus according to claim 4, wherein the rotators each comprise balls provided between the ring and the disc.

6. The chain-type bit-storing apparatus according to claim 5, wherein each of the ring and disc comprises an annular groove for receiving the balls.

7. The chain-type bit-storing apparatus according to claim 4, wherein the rotator comprises an adjusting element in the form of a threaded bolt, and the connector comprises a screw hole for a receiving a portion of the adjusting element so that another portion of the adjusting element abuts the disc to adjust the distance between the disc and connector.

8. The chain-type bit-storing apparatus according to claim 1, wherein the pivoting unit comprises:
   a guiding element;
   a pivoting element pivotally provided on the guiding element; and
   a cover for keeping the pivoting element on the guiding element.

9. The chain-type bit-storing apparatus according to claim 8, wherein the guiding element comprises an arched track, and the pivoting element comprises an arched groove for receiving the arched track.

10. The chain-type bit-storing apparatus according to claim 9, wherein the frame being pivoted by the pivoting unit comprises an upper side and a lower side, and the pivoting element comprises:
    a first block formed thereon and with a contact face for contacting the associated socket and another contact face for contacting the upper side of the frame being pivoted;
    a second block formed thereon and with a contact face for contacting the associated socket and another contact face for contacting the lower side of the frame being pivoted; and
    a third block formed thereon and with a contact face for contacting the associated socket and another contact face for contacting the lower side of the frame being pivoted.

11. The chain-type bit-storing apparatus according to claim 8 comprising an actuating unit for actuating the pivoting element.

12. The chain-type bit-storing apparatus according to claim 11, wherein the actuating unit comprises:
    a lever;
    a first rod;
    a first joint for pivotally and movably connecting the rod to the lever;
    a second rod connected to the pivoting element; and
    a second joint for pivotally and movably connecting the second rod to the lever.

13. The chain-type bit-storing apparatus according to claim 12, wherein the lever comprises a slot through which a threaded bolt is driven in a screw hole defined in the first joint and another slot through which a threaded bolt is driven in a screw hole defined in the second joint.

14. The chain-type bit-storing apparatus according to claim 12, wherein the second joint comprises a groove for movably receiving an end of the second rod.

* * * * *